(12) United States Patent
Hosoda et al.

(10) Patent No.: US 7,304,796 B2
(45) Date of Patent: Dec. 4, 2007

(54) STEREOGRAM VIEWING APPARATUS

(76) Inventors: Kazunobu Hosoda, 1-5-9 Kotobashi, Sumida-ku, Tokyo (JP); Hideki Tuchiya, 71-1-501, Miharudai, Minami-ku, Yokohama-shi, Kanagawa-ken (JP); Yukio Kurano, 860-54 Higashifukai, Nagareyama-shi, Chiba-ken (JP)

(*) Notice: Subject to any disclaimer, the term of this patent is extended or adjusted under 35 U.S.C. 154(b) by 143 days.

(21) Appl. No.: 11/058,948

(22) Filed: Feb. 16, 2005

(65) Prior Publication Data

US 2005/0190444 A1  Sep. 1, 2005

(30) Foreign Application Priority Data

Mar. 1, 2004  (JP) .......................... 2004-000931 U

(51) Int. Cl.
*G02B 27/22* (2006.01)

(52) U.S. Cl. ...................................... 359/466; 359/462

(58) Field of Classification Search ................ 359/474, 359/477, 408, 411, 415, 416, 466; 40/743, 40/733, 779, 723, 747, 608, 606, 610, 124.16, 40/120

See application file for complete search history.

(56) References Cited

U.S. PATENT DOCUMENTS

| | | | | |
|---|---|---|---|---|
| 9,611 A | * | 3/1853 | Mascher | 359/474 |
| 1,850,887 A | * | 3/1932 | Laumonier | 206/45.23 |
| 5,309,280 A | * | 5/1994 | Jones | 359/474 |
| 6,456,433 B1 | * | 9/2002 | Jones | 359/466 |

* cited by examiner

*Primary Examiner*—Audrey Chang
(74) *Attorney, Agent, or Firm*—Adams & Wilks

(57) ABSTRACT

A stereogram viewing apparatus comprises a box having a cover pivotally attached thereto for pivotal movement between open and closed positions. A stereogram accommodating part holds a set of stereograms at the front of the inside of the cover. A foldable plate is disposed in the box and is provided with left and right eyepieces. The plate is foldable into a folded state to fit within the box to permit the cover to close and is movable to an unfolded state in which the plate positions the eyepieces frontward of the stereograms to enable a user to view the stereograms through the eyepieces. When the cover is in the upstanding open position, the box may be pivoted downwardly and rearwardly to an upside-down position to support the apparatus on a surface while the upstanding cover faces frontward. In this manner, the apparatus can be conveniently placed on a surface, such as a desk or the like, so that the stereograms may be viewed by a user without having to hold the apparatus in his hand.

1 Claim, 2 Drawing Sheets

STEREOGRAM VIEWING APPARATUS

BACKGROUND OF THE INVENTION

1. Field of the Invention

The present invention relates to a stereogram viewing apparatus that enables viewing of stereograms including a pair of left and right photographs arranged in parallel, via eyepieces.

2. Description of the Related Art

Generally, in stereogram viewing apparatus, a pair of left and right stereograms is viewed through eyeholes with a pair of left and right lens. Some folding type stereogram viewing apparatus have been developed, as disclosed in Japanese Utility Model Laid-Open No. 5-84925.

The conventional stereogram viewing apparatus, however, needs to be previously assembled to some extent on a commercial basis, or takes a trouble in transition to a state of use or in treatment after use. In addition, the apparatus is often difficult to use, depending on individual differences.

SUMMARY OF THE INVENTION

The present invention has an object to provide a stereogram viewing apparatus that can arrange stereograms easily from a stored state to a disposed state toward eyepieces, thereby enabling transition to a state of use and treatment after use by a simple operation.

A stereogram viewing apparatus according to the present invention comprises a box including a rectangular base plate, left and right side walls installed upright on left and right side edges of the base plate, respectively, and a front wall installed upright on a front edge of the base plate for interconnecting front edges of the left and right side walls, a cover member pivotally attached to respective rear extending parts of the left and right side walls for covering an upper surface of the box, a stereogram accommodating part for holding each of lower edges of a plurality of stereograms inserted in a position located along a rear edge of the base plate at the edge of the cover member, and a movable plate capable of being folded and including a pair of left and right eyepieces for viewing the plurality of stereograms in sequence. The movable plate is configured to render an attachment part of the eyepieces movable with a lower edge of the plate being locked, and is provided to be capable of being accommodated inside the box together with the plurality of stereograms.

In the stereogram viewing apparatus according to the present invention, the movable plate has a first fold adjustment part located in a position along the stereogram accommodating part, and a second fold adjustment part located in the vicinity of the lower edge of the eyepiece.

In the other stereogram viewing apparatus according to the present invention, the movable plate has an edge part thereof pivotally attached to a position located inside the box along the front wall of the box, the edge part being spaced apart from and under the eyepieces.

The cover member with its sides pivotally attached to respective rear extending parts of the left and right side walls of the box has a stereogram accommodating part formed in a position located along a rear edge of the box. Thus, as soon as the above-mentioned cover member is opened with an operator's right hand with the box being supported with the left hand, preparations for viewing stereograms are made. Then, the movable plate with a pair of left and right eyeglasses is picked up with fingers of the right hand, and the relative positions of the eyepieces are adjusted with respect to the stereograms with lower edges thereof being inserted into the stereogram accommodating part, so that the stereograms can be viewed through the eyepieces.

Further, the movable plate has a first fold adjustment part located in a position along the stereogram accommodating part, and a second fold adjustment part located in the vicinity of the lower edges of the eyepieces. Thus, a range of adjustment of the position of the eyepieces in the movable plate with respect to the stereograms is broadened, whereby just only the operation of the movable plate advantageously enables easy focusing.

When the movable plate has its edge pivotally attached to a position located inside the box along the front wall of the box, the edge being spaced apart from and under the eyepieces, the positions of the eyepieces are adjusted by an effect of cooperation between the box and the movable plate with respect to the stereograms held in the cover member, thereby folding and accommodating the movable plate after use in the box with significantly greater ease.

DESCRIPTION OF THE PREFERRED EMBODIMENTS

A box and a cover member in a stereogram viewing apparatus according to the present invention are preferably made of plastic. Note that as this type of container, an existing container, such as a case for a digital video disc (DVD), may be used.

A movable plate may be made of a cardboard.

Embodiments

Figure 1:
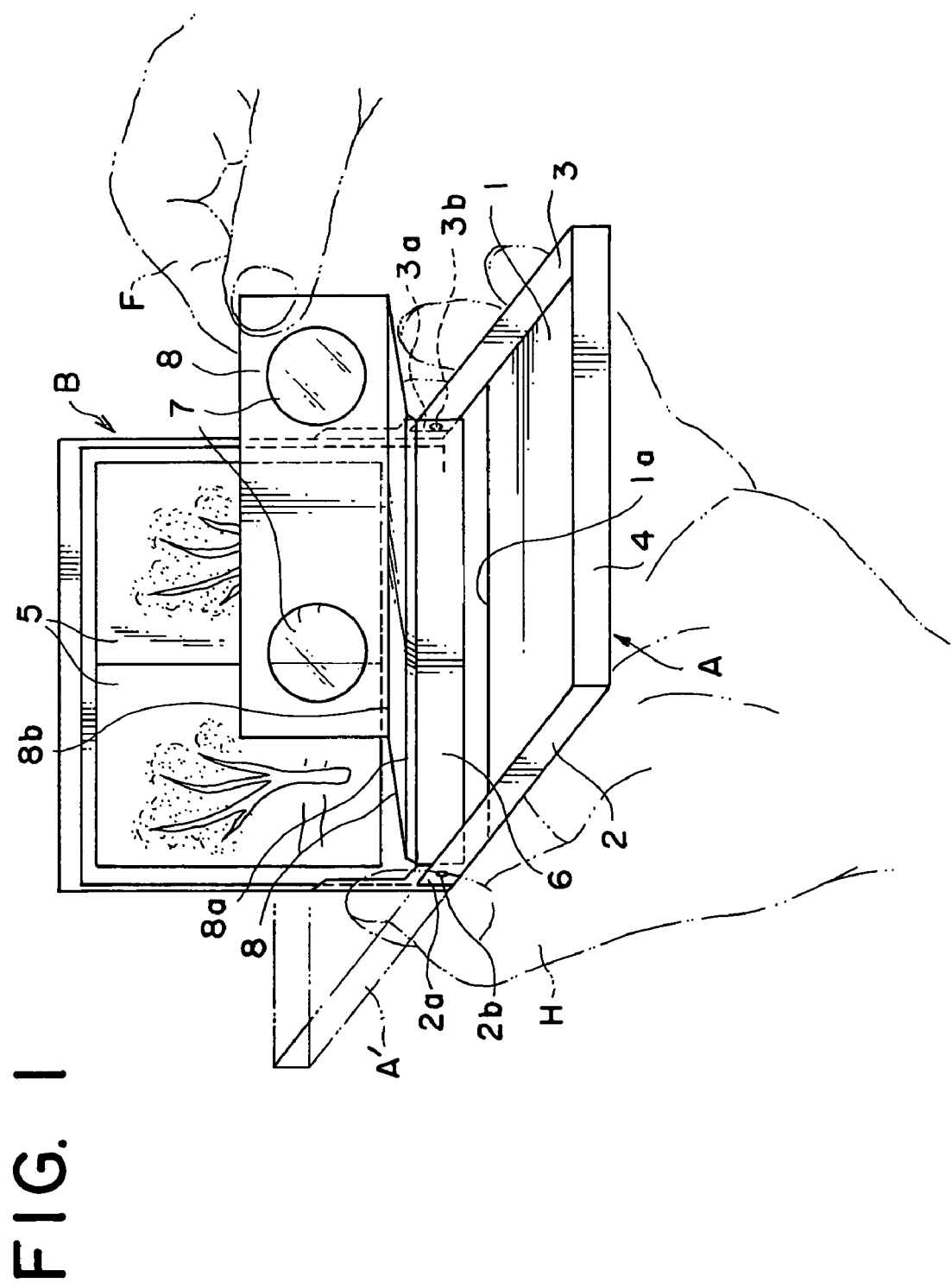
FIG. 1 is a perspective view showing a using state of a stereogram viewing apparatus taken as an embodiment 1 according to the present invention.

FIG. 1 illustrates a perspective view of a using state of a stereogram viewing apparatus taken as an embodiment 1 according to the present invention.

As shown in FIG. 1, the stereogram viewing apparatus comprises a container in the form of a box A which includes a rectangular base plate 1, left and right side walls 2 and 3 installed upright on both left and right side edges of the base plate 1, respectively, and a front wall 4 installed upright on a front edge of the base plate 1 for interconnecting the respective front edges of the left side wall 2 and the right side wall 3, and a cover member B pivotally attached to respective rear extending parts 2a and 3a of the left and right side walls 2 and 3 by supporting shafts 2b and 3b for covering an upper surface of the box A. The stereogram viewing apparatus is further provided with a stereogram accommodating part 6 for holding lower edges of a plurality of stereograms 5 inserted while being superimposed or stacked on each other, in a position located along a rear edge of the base plate 1 at the edge of the cover member B so that the stereograms are disposed at the front of the inside of the cover member B.

A movable, foldable plate 8 which includes a pair of left and right eyepieces 7 for viewing the plurality of stereograms 5 in sequence, is configured to render an attachment part of the eyepieces 7 movable with a lower edge of the plate being locked.

Thus, the cover member B is configured to slightly enter the interior of the box A together with a plurality of stereograms 5 so as to close an opening of the box A when the cover member is in a closed position.

The movable plate 8 has a first fold line or fold adjustment part 8a located in a position along the stereogram accommodating part 6, and a second fold line or fold adjustment part 8b located in the vicinity of the lower edges of the eyepieces 7.

In the above-mentioned embodiment 1, the cover member B having its both sides pivotally attached to the respective rear extending parts 2a and 3a of the left and right side walls 2 and 3 of the box A is provided with the stereogram accommodating part 6 in the position located along the rear edges of the box A. When the cover member B is pivoted to an open position by an operator's right hand with the box A being supported by the left hand H, preparations for viewing the stereograms 5 are made. Then, the movable plate 8 with the pair of left and right eyepieces 7 is picked up by fingers of the right hand F, and as the folded plate 8 is unfolded the relative positions of the eyepieces 7 are adjusted with respect to the stereograms 5 with lower edges thereof being inserted into the stereogram accommodating part 6, thereby enabling viewing of the stereograms 5 through the eyepieces 7.

Further, the movable plate 8 has the first fold adjustment part 8a located in a position along the stereogram accommodating part 6, and the second curve adjustment part 8b located in the vicinity of the lower edges of the eyepieces 7. Thus, a wide range of adjustment of the positions of the eyepieces 7 in the movable plate 8 with respect to the stereograms 5 is possible by only the operation of the movable plate 8 which advantageously enables easy focusing.

Note that in the embodiment 1, the box A is rotated downward and rearward around the supporting shafts 2b and 3b to a rear upside-down position A' with the cover member B remaining in the upright position shown in FIG. 1, so that the box A can be stopped by a rear edge 1a of the base plate 1 serving as a stopper. And when the box A is put on a desk or the like as it is, the stereograms 5 can be viewed, while adjusting the positions of the eyepieces 7 by adjusting the movable plate 8.

Figure 2:
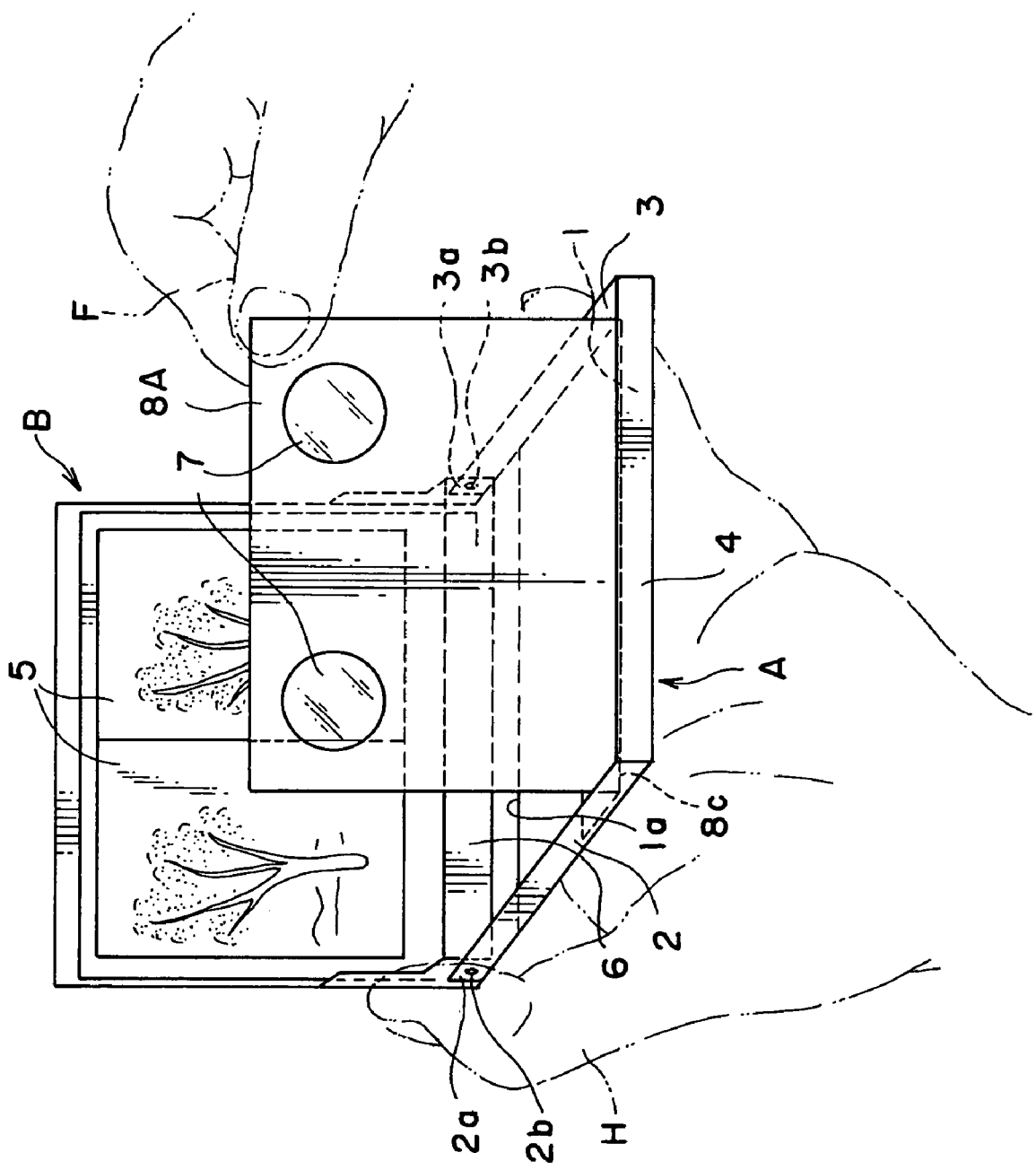
FIG. 2 is a perspective view showing a using state of a stereogram viewing apparatus taken as an embodiment 2 according to the present invention.

Now, a stereogram viewing apparatus taken as an embodiment 2 according to the present invention will be explained hereinafter. FIG. 2 is a perspective view showing a using state thereof.

As shown in FIG. 2, also in the case of the embodiment 2, the stereogram viewing apparatus comprises a box A which includes the rectangular base plate 1, the left and right side walls 2 and 3 installed upright on both left and right side edges of the base plate 1, respectively, and the front wall 4 installed upright on the front edge of the base plate 1 for interconnecting the respective front edges of the left and right side walls 2 and 3, and a cover member B pivotally attached to the respective rear extending parts 2a and 3a of the left and right side walls 2 and 3 by the supporting shafts 2b and 3b for being capable of covering the upper surface of the box A. The stereogram viewing apparatus is further provided with the stereogram accommodating part 6 for holding lower edges of a plurality of stereograms 5 inserted while being superimposed on each other, at the edge of the cover member B in the position located along the rear edge of the base plate 1.

A movable plate 8A which is capable of being folded and which includes a pair of left and right eyepieces 7 for viewing the plurality of stereograms 5 in sequence, is configured to render the attachment part of the eyepiece 7 movable with the lower edge of the plate being locked.

Thus, the cover member B is configured to enter the interior of the box A together with a plurality of stereograms 5 so as to close the opening of the box A.

In this example 2, the movable plate 8A has its edge 8c pivotally attached to a position located along the front wall 4 of the box A on the base plate 1 inside the box A, the edge being spaced apart from and under the eyepieces 7.

Also, in the above-mentioned example 2, the cover member B having its both sides pivotally attached to the respective rear extending parts 2a and 3a of the left and right side walls 2 and 3 of the box A is provided with the stereogram accommodating part 6 in the position located along the rear edges of the box A. As soon as the cover member B is opened with the operator's right hand with the box A being supported with the left hand H, preparations for viewing the stereograms 5 are made. Then, the movable plate 8A with a pair of left and right eyeglasses 7 is picked up with fingers of the right hand F, and the relative positions of the eyepieces 7 are adjusted with respect to the stereograms 5 with lower edges thereof being inserted into the stereogram accommodating part 6, thereby enabling viewing of the stereograms 5 through the eyepieces 7.

The movable plate 8A has its edge 8c pivotally attached to a position located along the front wall 4 of the box A inside the box A, the edge being spaced apart from and under the eyepieces 7. Thus, the positions of the eyepieces 7 are adjusted by an effect of cooperation between the box A and the movable plate 8A with respect to the stereograms 5 held in the cover member B, thereby folding and accommodating the movable plate 8A after use in the box with significantly greater ease.

The stereogram viewing apparatus of the present invention is compact in size and enables easy viewing of stereograms. Even when the stereogram viewing apparatus has a slightly large size, the apparatus permits the stereograms, such as art works exhibited in a gallery, or exhibits in a museum, to be viewed in a highly attractive state, so that the apparatus may be used as a souvenir after viewing.

What is claimed is:

1. A stereogram viewing apparatus comprising:

a box including a rectangular base plate, left and right side walls installed upright on both left and right side edges of the base plate, respectively, and a front wall installed upright on a front edge of the base plate for interconnecting front edges of the left and right side walls;

a cover member pivotally attached by supporting shafts to respective rear extending parts of the left and right side walls for pivotal movement between a closed position for covering an upper surface of the box and an upstanding open position;

a stereogram accommodating part for holding lower edges of a plurality of stereograms inserted in a position located along a rear edge of the base plate at the edge of the cover member; and a movable, foldable plate having a pair of left and right eyepieces for viewing the plurality of stereograms in sequence, wherein the movable, foldable plate is configured to render an attachment part of the eyepieces movable with a lower edge of the plate being locked, and is foldable to be accommodated inside the box together with the plurality of stereograms, the movable, foldable plate has a first fold adjustment part located in a position along the stereogram accommodating part, and a second fold adjustment part located in the vicinity of the lower edges of the eyepieces, and the box is pivotal downward around the supporting shafts to a rear position with the cover member remaining in its upstanding open position, a rear edge of the base plate serving as a stopper to limit the pivotal downward movement of the box, so as to enable the box to be placed on a surface for viewing of the stereograms.

* * * * *